K. GYR.
ELECTRICAL MEASURING INSTRUMENT.
APPLICATION FILED MAR. 27, 1911.
1,088,897.
Patented Mar. 3, 1914.
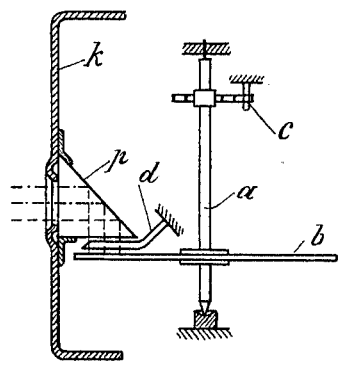
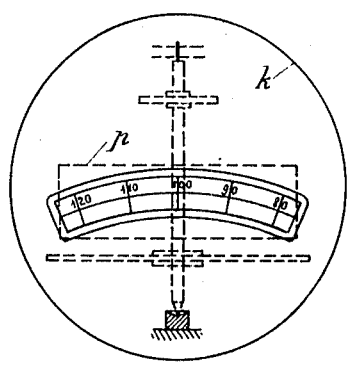
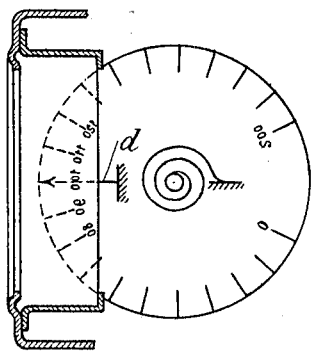
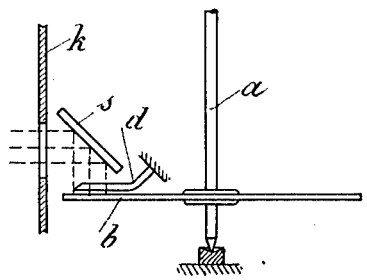
Witnesses:
H. Geistlich
J. Bosshart.
Inventor:
Karl Gyr

UNITED STATES PATENT OFFICE.

KARL GYR, OF ZUG, SWITZERLAND.

ELECTRICAL MEASURING INSTRUMENT.

1,088,897.     Specification of Letters Patent.     Patented Mar. 3, 1914.

Application filed March 27, 1911. Serial No. 617,453.

*To all whom it may concern:*

Be it known that I, KARL GYR, a citizen of the Swiss Confederation, residing at Zug, Canton of Zug, Switzerland, have invented new and useful Improvements in Electrical Measuring Instruments, of which the following is a specification.

The present invention relates to improvements in measuring instruments having a rotor with a vertical axis, a movable dial and a device for returning the rotor into its zero position.

The essential feature of the invention resides in the provision of a device for transmitting the indications of the dial by optical means to a plane or screen from which the readings are to be made.

A simple form of the device consists for example in the arrangement of a scale on a movable disk or on a disk provided with a vertical spindle fixed to the movable part of the rotor and a stationary pointer, the numbers on the scale being written in mirror script while a reflecting glass or prism is arranged above the dial by means of which the relative positions between dial and said stationary pointer are reflected upon a plane or screen from which the indications may be read off in the customary manner. According to the present invention the readings may be taken in the manner customary with measuring instruments provided with a rotor having a vertical axis. Important advantages are derived from the above arrangement. Each switch board instrument is at once converted into a measuring instrument of high precision as the deviation from the correct reading due to a horizontal arrangement of the spindle is obviated. Moreover the expensive and inaccurate mounting of the rotor between points and the necessity of accurately balancing the horizontal rotor are obviated and incorrect mounting of the instrument or shocks to which the same may be exposed exert no influence on the correctness of the readings. The rotor will be free to move without having a tendency of lingering in certain positions.

In the accompanying drawing the invention is illustrated by way of example showing diagrammatically the preferred form of the invention.

Figure 1 is an elevation partly in section of a part of a measuring instrument according to the present invention. Fig. 2 is a front view of the same. Fig. 3 is a plan view and Fig. 4 is an elevation of a modified form of the invention.

In the drawing, *a* denotes the shaft of the rotor and *b* the rotor of a measuring instrument, to which a scale is secured the numbers of which are written in mirror script. The shaft *a* stands under the action of a coil spring *c* having the tendency of holding the disk in its zero position. *d* denotes a stationary pointer arranged over said scale. Above said scale and said pointer *d* a reflecting or refracting glass prism *p* is secured to a stationary part of the instrument by means of a holder *k*. The prism *p* is arranged in such a manner that it reflects the scale and the image of the pointer through an opening of the holder *k* in such a way that the reading may be taken in the customary manner from a vertical plane in front of the reader, even if the shaft of the rotor is vertically mounted. No special source of light will be required to make the readings visible as said prism is adapted to throw sufficient light on the scale. According to the size and shape of the prism the size of the reflected scale may be varied.

In some instances a mirror *s* may be substituted for the prism as for example shown in Fig. 4. The scale may also be secured to the inner or to the outer side of the cover *k*, above or below the disk from which the readings are taken.

The above described device may be used in combination with all types of measuring instruments for instance with water meters, ammeters, and watt-meters for direct and alternating current and also with apparatus for measuring frequency and the like. If used with measuring instruments of the induction or Ferraris type, the scale may be attached to the armature.

It is to be understood that changes may be made in the general arrangement of the parts and their form, without deviating from the scope or spirit of the present invention.

I claim:

1. In a measuring instrument of the character described, the combination of a substantially vertically disposed wall portion having an opening therein, a horizontally disposed rotor having a dial scale and rotatable about a vertical axis and having one peripheral portion of the dial adjacent said opening to disclose the dial, a fixed pointer disposed abreast of the dial of said rotor, and a single prism disposed in said opening and overhanging the dial of said rotor to reflect the position of the dial with respect to the pointer in a vertically readable image at such opening, substantially as described.

2. In a measuring instrument of the character described, the combination of a substantially vertically disposed wall portion having an opening therein, a horizontally disposed dial rotor and a pointer abreast of the dial of said rotor, the one being movable with respect to the other, and a single element for reflecting the position of the dial with respect to the pointer in a vertically readable image at such opening, substantially as described.

In testimony whereof I affix my signature in presence of two witnesses.

KARL GYR.

Witnesses:
 ARTHUR J. BUNDY,
 AUGUST RÜEGG.

Copies of this patent may be obtained for five cents each, by addressing the "Commissioner of Patents Washington, D. C."